March 24, 1942.   C. H. BARKER ET AL   2,277,505
CARRYING DEVICE FOR GEOPHYSICAL INSTRUMENTS
Filed Feb. 24, 1940   3 Sheets-Sheet 1

Inventors
Charles H. Barker and
Kearney Q. Roberts
By Dallas R. Lamont
Attorney

Inventors
Charles H. Barker and
Kearney Q. Roberts
By Dallas R. Lamont
Attorney

Patented Mar. 24, 1942

2,277,505

UNITED STATES PATENT OFFICE 2,277,505

CARRYING DEVICE FOR GEOPHYSICAL INSTRUMENTS

Charles H. Barker and Kearny Q. Robert, Dallas, Tex., assignors, by mesne assignments, to Socony-Vacuum Oil Company, Incorporated, New York, N. Y., a corporation of New York Application February 24, 1940, Serial No. 320,724

4 Claims. (Cl. 265—1.4)

This invention relates generally to geophysical surveying instruments and more particularly to an apparatus for transporting an instrument and setting it up for operation at any desired station.

In conducting geophysical surveys by means of instruments such as the gravity meter, it has heretofore been necessary to transport the instrument to the location in the field where it is desired to take a reading, remove the instrument from the truck and set it up on a prepared spot on the ground. After the reading had been taken it was necessary to recase the instrument and lift it back into the truck before it could be transported to the next station at which it was desired to take a reading. This obviously consumed at least fifty percent of the time spent in the field in conducting surveys. Due to the cumbersomeness of instruments of this character, attributable to the fact that the instrument must be permanently mounted in a thermal oven or cabinet, at least two men or sometimes as many as four are required to handle the instrument while loading it into the truck and unloading it without injuring the delicate apparatus within the thermal oven. The extreme delicateness of these highly sensitive instruments prohibits rough handling of the instrument. Although the instrument is calibrated in the laboratory and its suspended mass clamped when the instrument is moved from point to point, an appreciable shock delivered to the instrument will sometimes so seriously damage the instrument that it is necessary to return it to the laboratory for recalibration.

Therefore, it is the primary object of this invention to provide an apparatus for transporting a geophysical surveying instrument and for setting it up at a particular location where a reading is desired without the necessity of removing the instrument from the truck.

Still another object of this invention resides in the provision of means whereby the instrument can be set up directly in contact with the earth's surface, free of any contact with the truck body, without removing the instrument from the inside of the truck body.

Still another object of the invention resides in the provision of a plurality of legs for the instrument base that can be lowered to the ground through openings in the bed of the truck body.

Another object of this invention resides in the provision of means whereby the instrument can be raised out of contact with the bed of the truck body and rigidly clamped to the legs which extend through the bed of the truck to the ground.

This invention further contemplates pneumatic means that forms a cushion for the instrument.

Another object of this invention resides in the provision of means whereby the base of the gravity meter can be accurately leveled.

Other objects and advantages of this invention will become apparent from the following detailed description when considered in connection with the drawings in which:

Figure 5 is an elevational view of the vernier level adjusting means.

Figure 1:
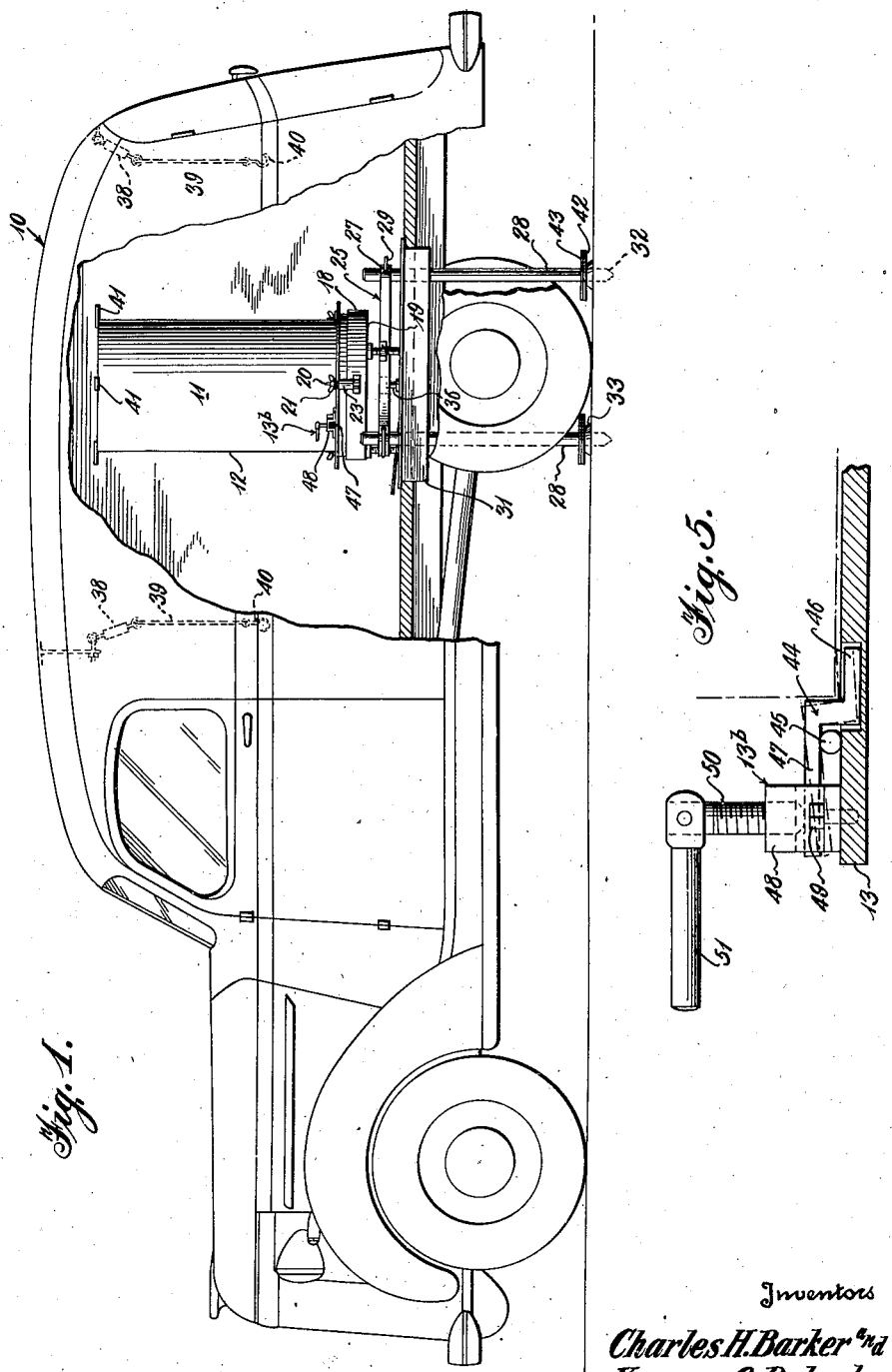
Figure 1 is an elevational view of the truck and instrument showing the instrument in operative position and a side portion of the truck cut away.
Figure 2:
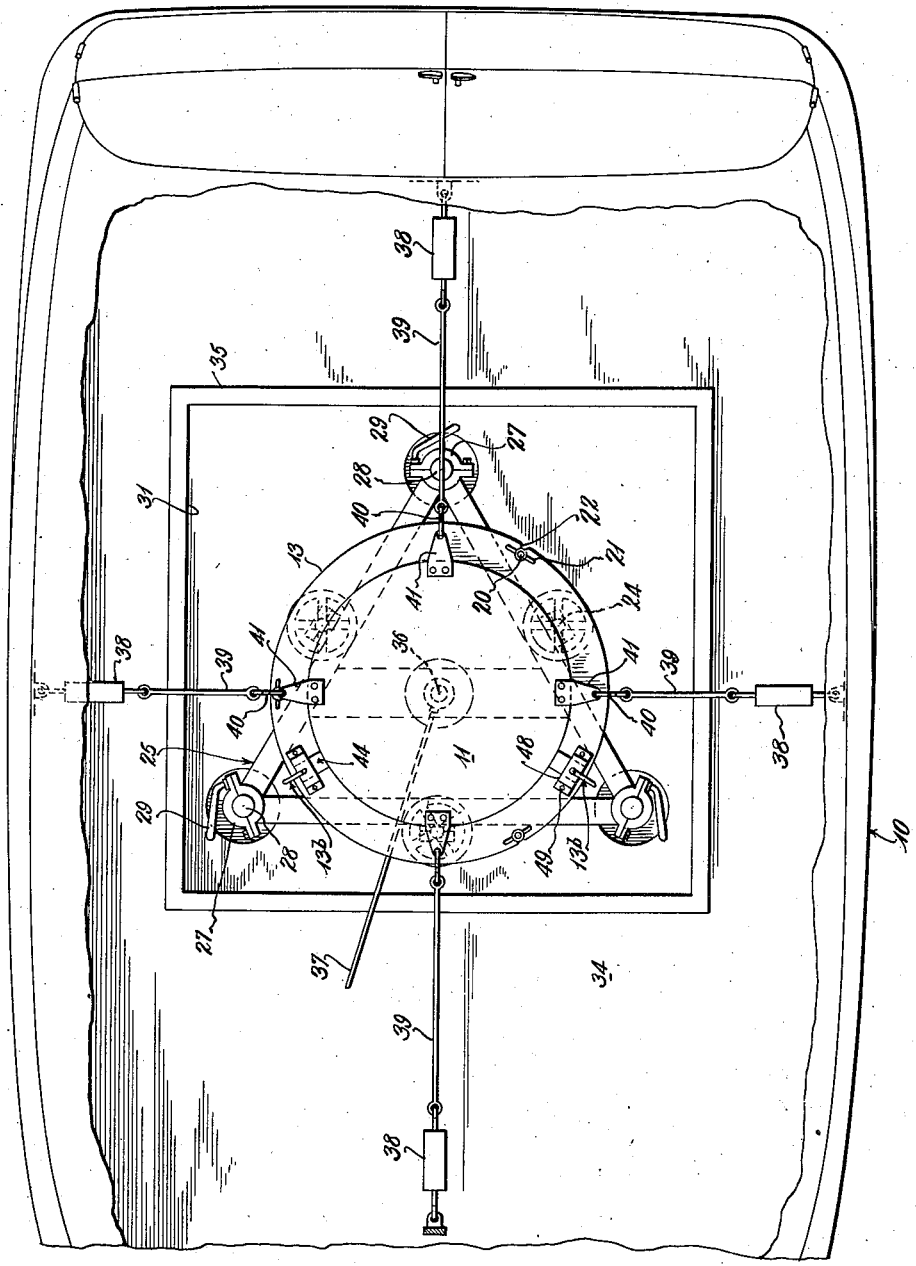
Figure 2 is a plan view of the instrument located within the truck body showing the manner in which it is secured to the truck for transportation.

Referring to the drawings in detail, particularly Figures 1 and 2, there is shown a conventional truck body 10 having disposed therein a geophysical instrument 11 with the novel mounting means forming the subject matter of this application. The geophyical instrument 11 comprises a delicate apparatus such as a gravity meter, not shown, permanently mounted within a thermal oven or case 12. The bottom of the case 12 rests on a riding plate 13 of a diameter appreciably greater than the diameter of the thermal oven or case. A bracket 13a is secured to the riding plate 13 and is adapted to form with the vernier adjusting means 13b, holding means for the bottom of the thermal oven 12, which will prevent the bottom of the oven from shifting relative to the riding plate 13. In order to provide a cushion for the gravity meter to absorb shocks or vibrations that would be transmitted to it through the body of the vehicle during transportation, a wooden dowel member 14 that is secured to the bottom surface of the riding plate 13, is adapted to fit within and be carried by a pneumatic tube 15. The periphery of this dowel member has formed therein an annular groove that is arcuate in cross-section. This groove is adapted to receive a portion of the upper and inner surface of the pneumatic tube 15 which is of the type used in airplane wheel tires. A portion of the bottom and outer surface of the tube 15 is seated in a wood-retaining ring 17 that fits snugly within the upwardly extending flange 18 of the level plate 19. Pivotally secured to the outer surface of the upwardly extending annular flange 18 are the eyes of eye-bolts 20 that are adapted to be secured by wing nuts 21 in the slots 22 provided in the periphery of the riding plate 13.

Figure 4:
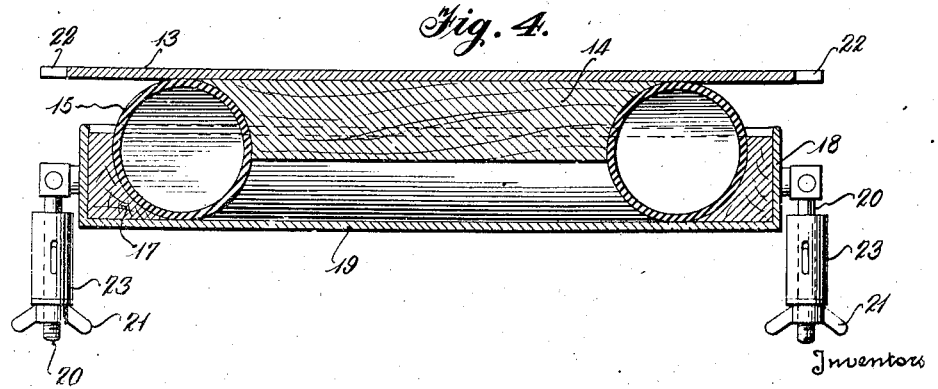
Figure 4 is a detailed sectional view showing the pneumatic cushion for the instrument.

When the instrument is being transported from one location to another, the eye-bolts 20 are disengaged from the riding plate 13 and allowed to swing freely as shown in Figure 4, thereby permitting the instrument to ride freely on the pneumatic tube 15. However, when the instrument is on location and when readings are to be made, the eye-bolts 20 are raised into their slots 22 in the riding plate 13 so that when the wing nuts 21 are screwed down tight against the plate 13, the plate will be firmly held against the spacers 23. The level plate 19 is supported by leveling screws 24 that are threaded through a tripod head 25. The upper end of the leveling screws are rotatably secured to cups 26 that are carried on the bottom surface of level plate 19. The tripod head 25 has formed in its three corners, bearing clamps 27 that are adapted to receive vertically disposed legs 28. The bearing clamps 27 are provided with means 29 whereby the legs 28 may be adjusted vertically relative to the tripod head 25 and firmly clamped in this position. Legs 28 extend downwardly through the bearing clamps 27 through an opening in the bottom of a floor pan 31 to engage the earth's surface. The ends of these legs 28 are pointed as shown at 32 and are provided with annular fins 33 that serve as stops which will prevent the bottom ends of the legs from sinking to an indefinite depth in soft soil.

The floor pan 31 is substantially square, as shown in Figure 2, and is adapted to be supported within a square opening in the floor 34 of the truck body by means of the flange 35. This pan is formed of sheet metal such as steel and is made sufficiently strong that it will carry the entire weight of the gravity meter and its mount when transporting the instrument from one location to another. Disposed within the pan at a point directly under the center of the tripod head is a hydraulic jack 36 by means of which the instrument can be raised or lowered relative to the pan 31. Although this jack is shown as being the conventional type that is sold as an automobile accessory, any type that would function to smoothly raise or lower the instrument can be used. The jack 36 is provided with a handle 37 for its actuation.

Figure 3:
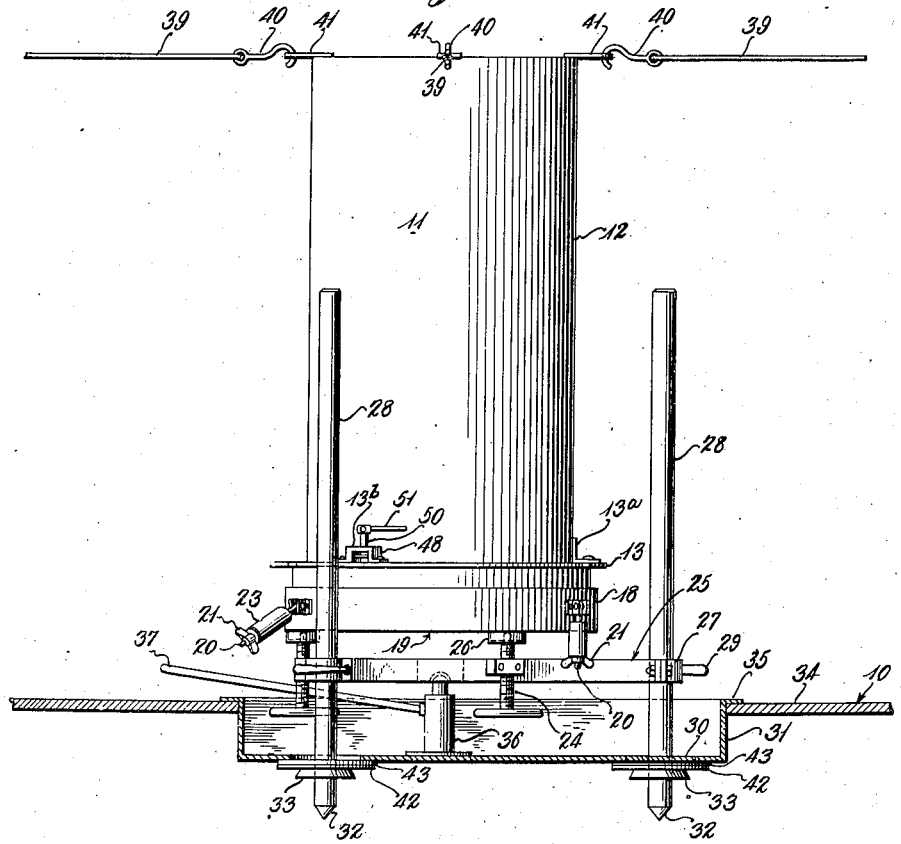
Figure 3 is an elevational view of the instrument and its securing means showing the instrument secured in the truck ready for transportation.

In Figures 2 and 3 the instrument is shown clamped within a truck body and ready to be transported from one point to another. The top of the instrument 11 is resiliently held in position by means of shock absorbers 38. One end of each of the shock absorbers is anchored to the truck body as shown in Figure 2. The other end of each shock absorber is secured by means of cables 39 and hooks 40 to eyelets 41 that are secured to the top of the thermal oven or case 12.

In order to cushion the bottom of the thermal oven against shock in transportation, the eye-bolts 20 are swung down out of engagement with the slots 22 in the riding plate 13. The level plate 19 is secured to the tripod head 25 through means of the cup-shaped members 26 and the leveling screws 24. The assembly is then held in position by the legs 28 that are clamped to the tripod head by means of the clamping bearings 27 and the jack 36. Above the fin 33 on the bottom of each leg 28 are disposed steel washers 42 and sponge rubber washers 43, the sponge rubber washers being between the steel washers 42 and the bottom of the floor pan 31. With the jack 36 in its lowest position and the legs 28 raised, the clamping bearings 27 are secured to the legs by the clamping screws 29. Then the jack is raised far enough to raise the tripod head and the legs until the rubber washers 43 and the steel washers 42 press against the bottom of the floor pan 31. With this arrangement the instrument in transportation has a four-point contact with the floor pan 31, which will securely hold the base of the instrument in position during transportation.

When it is desired to set up the instrument for the purpose of taking a reading, the truck is driven to location, the location usually being laid out upon a highway, and stopped at the point where it is desired to take a reading. The operator then enters the body of the truck and by means of the jack actuating handle 37, lowers the jack piston until the washers on the bottom of the legs no longer are pressing against the bottom of the floor pan 31. Then the bearing clamps 27 are loosened by means of the screws 29 and the legs 28 are allowed to drop and contact the earth. When the legs have been forced downwardly until a secure footing is obtained, the screws 29 are again tightened to secure the tripod head to the legs. After each leg has been securely clamped to the tripod head, the piston of jack 36 is lowered until it no longer contacts the tripod head 25. At this point the legs 28, the tripod head 25 and all parts of the base of the gravity meter are out of contact with the truck body. To free the top of the gravity meter, hooks 40 are released from the eyelets 41. At this stage in setting up the instrument, the legs 28 are in firm contact with the earth's surface. Eye-bolts 20 are then swung up into contact with the slots 22 in the riding plate 13 and by means of the wing nuts 21, the plate is rigidly clamped against the spacers 23. The instrument oven and contained instrument is then in firm contact with the ground in which state it is ready to be leveled for purpose of taking a reading. The instrument is then leveled by means of the screws 24 which work against the bottom of the leveling plate 19. The instrument is made as nearly level as possible with these leveling screws. Then by means of vernier leveling devices 13b, such as shown in Figure 5, minute adjustments are made to make the instrument exactly level.

The vernier leveling means 13b, as shown in Figure 5, consist of a lever 44 pivoted on the element 45. The lever 44 is provided with an offset portion 46 that is adapted to extend under the bottom edge of the thermal oven. The opposite end 47 of the lever 44 extends outwardly from the oven into a yoke 48. Yoke 48 is secured to the riding plate 13 by means of bolts 49. The center of the yoke is provided with a threaded opening adapted to receive an adjusting screw 50 which engages the top surface of the outer end 47 of lever 44. By rotating the screw 50 by means of the lever 51 in such a manner that it will be screwed into yoke 48, the outer end 47 of the lever 44 will be forced downwardly to raise the bottom edge of the thermal oven, which is resting on the offset end 46 of this lever.

After vernier adjustment for level has been made, the apparatus is then in position for the operator to unclamp the suspended mass and take the desired reading.

Although this invention has been described in detail in connection with an apparatus by means of which a gravity meter can be transported from point to point in a truck and set up for operation without taking it out of the truck, it is obvious to those skilled in the art that other instruments such as the torsion balance could be handled in the same manner.

Many other detailed features that may be added as refinements to the gravity meter mount illustrated will immediately be apparent to those skilled in the art and it is to be understood that the scope of this invention includes the principles of this invention regardless of whether or not these numerous additional features are incorporated.

Additionally, it is obvious to those skilled in the art that elements used such as the pneumatic tube of an airplane wheel tire have their full equivalents which come within the scope of this invention.

We claim:

1. A support for a force measuring instrument comprising in combination a riding plate, on which the base of the force measuring instrument is adapted to rest, said riding plate having a plurality of spaced radial slots in its periphery, a level plate, a toroid shaped pneumatic cushion on said level plate adapted to resiliently support the force measuring instrument when moved from point to point, a dowel member secured to the bottom of the riding plate that is adapted to rest on the upper, inner surface of the cushion, a tripod, said tripod having vertically adjustable legs, common means threadedly engaging the tripod for supporting the level plate and raising or lowering it whereby the base of the force measuring instrument can be made level and clamps adapted to engage the spaced radial slots in the periphery of the riding plate to rigidly secure the riding plate to the tripod when readings of gravitational force are being made.

2. An apparatus for transporting sensitive instruments which depend upon contact with the earth's surface for their operation that comprises in combination, a base structure and a cushion structure thereon for yieldably supporting said instrument, releasable means for rigidly mounting said base in a vehicle body, means associated with said base and projectable into contact with the earth's surface through but out of contact with the vehicle body, and means for leveling said instrument upon said contacting means.

3. An apparatus for transporting sensitive instruments which depend upon contact with the earth's surface for their operation that comprises in combination, a base structure and a cushion structure thereon for yieldably supporting said instrument, means for selectively rendering said cushion structure inoperative, releasable means for rigidly mounting said base in a vehicle body, means associated with said base and projectable into contact with the earth's surface through but out of contact with the vehicle body, and means for leveling said instrument upon said contacting means.

4. An apparatus for transporting sensitive instruments which depend upon contact with the earth's surface for their operation, that comprises in combination, a base structure, a toroid cushion structure thereon for yieldably supporting said instrument, said base structure including a level plate, an annular upwardly extending flange thereon for limiting the outward displacement of said cushion, releasable means for rigidly mounting said base in a vehicle body, means associated with said base and projectable into contact with the earth's surface through but out of contact with the vehicle body, and means for leveling said instrument upon said contacting means.

CHARLES H. BARKER.
KEARNY Q. ROBERT.